Patented May 4, 1948

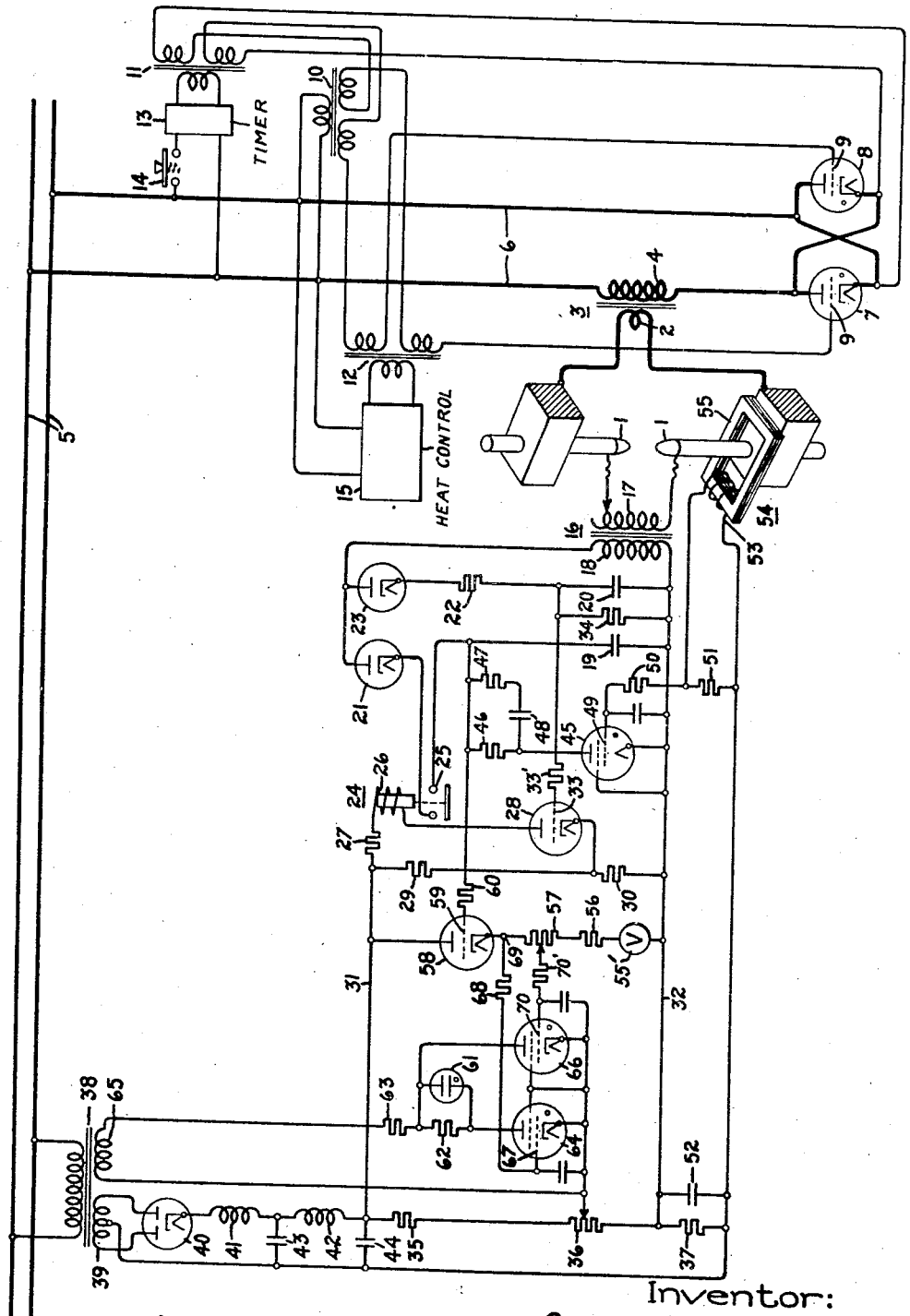

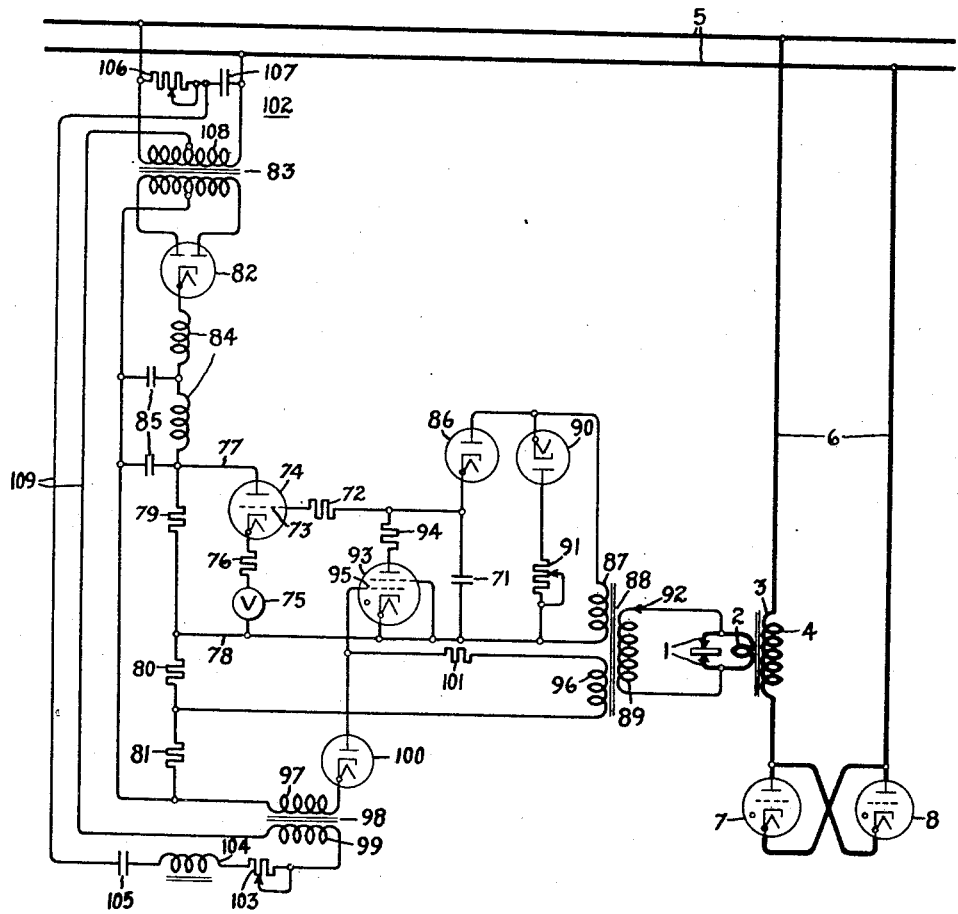

2,440,962

UNITED STATES PATENT OFFICE 2,440,962

CIRCUIT FOR MEASURING THE LAST HALF CYCLE VOLTAGE ACROSS A RESISTANCE WELD

Orrin W. Livingston, Scotia, N. Y., assignor to General Electric Company, a corporation of New York Application May 4, 1944, Serial No. 534,120

20 Claims. (Cl. 171—95)

My invention relates to electric control circuits and more particularly to improved control circuits adapted for obtaining a measurement of the last half cycle value of an electrical condition that occurs in a load circuit during a period of energization thereof and for maintaining said measurement during the immediately following period of deenergization of said load circuit.

Although of general utility, circuits embodying my invention are particularly suited for indicating the quality of resistance spot welds formed between parts by applying thereto a predetermined time application of welding current flow through the agency of pressure exerting electrodes.

As pointed out in application Serial No. 534,010, Eugene R. Spittler and Ivar W. Johnson for Resistance welding and resistance weld testing filed concurrently herewith and assigned to the same assignee as this invention, it has been discovered that the variation in closed circuit voltage across a resistance weld during its formation is a satisfactory criterion of its quality. As more fully described in that application, it has been determined that in the case of ferrous metals the voltage across the weld increases in value as the weld is formed and becomes substantially constant upon the formation of a satisfactory weld. Likewise, in the formation of non-ferrous welds, such as welds between parts of aluminum, aluminum alloys, brass and the like, it has also been determined that the voltage across the weld decreases in value as the weld is formed and again attains a substantially constant value when a weld of satisfactory quality has been formed. Methods of controlling resistance welding operations in accordance with the substantially constant value of voltage at the end of a weld as well as the voltage across the weld at the end of the welding operation have been claimed in this Spittler & Johnson application. Since the magnitude of the voltage across a resistance weld for the last half cycle of welding time may be used as a measure of weld quality, circuits embodying my invention may be used for measuring this last half cycle value of voltage and comparing it with a predetermined value for like welds of desired quality in order to determine the quality of the weld being formed. Such circuits preferably include, in addition to an indicating device, a suitable alarm system which will inform the welding operator when an unsatisfactory weld has been made.

It is consequently an object of my invention to provide a new and improved electric control or indicating circuit.

It is a further object of my invention to provide a new and improved electric control circuit for indicating the last half cycle value of an electrical condition that occurs during an energization period of an intermittently energized alternating current load circuit and for maintaining said indication during the immediately following period of deenergization of said load circuit.

It is also an object of my invention to provide a new and improved indicating circuit including a capacitor which is charged in response to an electrical condition that occurs in an alternating current load circuit during half cycles of a polarity corresponding to that of the last half cycle of an energization period and which is discharged in response to half cycles of opposite polarity.

It is also an object of my invention to provide an electric control circuit which may be used for indicating the quality of a resistance spot weld immediately after its formation.

Further objects of my invention will become apparent from the following description of two embodiments thereof diagrammatically represented in Figs. 1 and 2 of the accompanying drawings.

Each control circuit illustrated in these drawings is in reality a special type of vacuum tube voltmeter whose function is that of indicating the magnitude of the voltage across a resistance weld for the last half cycle of alternating current flow and also that of providing an alarm for warning the operator of the formation of an unsatisfactory weld. A capacitor forming a part of each system is charged during a welding operation in accordance with the maximum voltage value occurring during half cycles of a polarity corresponding to that of the last half cycle of an energization period of the welding circuit and is discharged during half cycles of a polarity opposite that of the last half cycle of the energization period of the welding circuit. At the end of a welding period the last half cycle charge on the capacitor is maintained during the immediately following period of deenergization of the welding circuit and means are provided for indicating the value of this charge. Means are also provided for comparing the magnitude of this capacitor charge with a predetermined standard value for welds of desired quality and for warning the welding operator when the last half cycle value of voltage for a welding period does not fall within desired operational limits and consequently furnishes evidence of the formation of an unsatisfactory weld.

In the system shown in Fig. 1 the electrodes 1 of a resistance welding machine are connected to the terminals of the secondary 2 of a welding transformer 3 having a primary winding 4. The primary winding 4 of the welding transformer is connected to a source of alternating current supply 5 through conductors 6 and a pair of electric valves 7 and 8 which are reversely connected in parallel with one another. These electric valves may be of the type employing an immersion igniter control element or, as illustrated, may include a heated cathode and utilize an ionizable medium such as a gas or vapor.

Each of these electric valves 7 and 8 is provided with a control element 9 whose energization is controlled to determine the cycles and the instant in each cycle that the associated valve is rendered conductive. The excitation circuits for controlling the energization of these control elements may be of any of the types well known in the art and in Fig. 1 have been illustrated as including a transformer 10 for applying a component of alternating current voltage to the control elements 9 which is in phase opposition to the anode-cathode voltages of electric valves 7 and 8 and transformers 11 and 12 for supplying components of alternating current voltage to these control elements which is in phase with their anode-cathode voltages.

Transformer 11 forms part of a timer 13 by means of which electric valves 7 and 8 are intermittently energized from the alternating current supply circuit 5 when energization is initiated by closure of a manually operated switch 14. Transformer 12 forms part of a heat control 15 by means of which a component of voltage derived from transformer 12 is adjusted in phase with respect to the anode-cathode voltages of electric valves 7 and 8 in order to control the magnitude of the current which it is desired to supply through these valves to the load circuit. The relative magnitudes of the control voltages in the excitation circuits of electric valves 7 and 8 is such that both the in-phase components supplied by transformers 11 and 12 are required to render electric valves 7 and 8 conducting. In this way the timer determines the cycles during which the valves conduct and the phase of the voltage derived from heat control 15 determines the time in the cycle that conduction is initiated. The component of voltage supplied by transformer 12 is preferably of peaked wave form. Heat control 15 may also embody current regulating means and may be any suitable type, for example that described and claimed in the copending application of Benjamin Cooper, Serial No. 480,150, filed March 23, 1943, assigned to the assignee of this invention, and now Patent No. 2,421,994, granted June 10, 1947.

As will be understood by those skilled in the art, the resistance welding system thus far described is placed in operation by closing manual switch 14. Thereafter, welding transformer 3 is energized for an interval or a succession of intervals under the control of timer 13 with a current having a magnitude depending upon the operation of heat control 15.

As previously stated, it has been discovered that the magnitude of the voltage across a resistance weld for the last half cycle of welding time may be used as a measure of weld quality. In the system illustrated in Fig. 1 this voltage is introduced into the weld indicator embodying my invention through the agency of a control transformer 16 having its primary 17 connected to the electrodes 1 of the welding machine at points near their work engaging surfaces. As illustrated, an adjustable connection may be provided in order to vary the number of primary turns of this transformer which are connected across the welding electrodes. The terminals of the secondary 18 of transformer 16 are connected to the parallel charging circuits for capacitors 19 and 20.

Capacitor 19 is charged through a unidirectional current conducting device 21 which is poled to pass current to the capacitor during half cycles of a polarity corresponding to the last half cycle of an energization period of the load circuit which in the arrangement illustrated comprises the weld being formed between electrodes 1 of the resistance welding machine. Capacitor 20 is charged in the same manner through a resistor 22 and a second unidirectional current conducting device 23 which is poled in the same manner as unidirectional current conducting device 21. Devices 21 and 23 may be of any suitable type and have been illustrated in the drawing as electric discharge devices.

Capacitor 19 is employed for measuring the voltage across the weld and capacitor 20 forms part of a time delay circuit including a relay 24 having contacts 25 in the charging circuit of capacitor 19. This relay operates in a manner to close the charging circuit of capacitor 19 when welding current flows and to open this charging circuit a short interval of time after the flow of welding current ceases and before electrodes 1 of the welding machine are withdrawn from the work. Consequently, any sparking between the welding electrodes and the work at the time the electrodes disengage the work is prevented from increasing the charge on capacitor 19 which, as will be pointed out below, has a value depending upon the maximum value of the last half cycle of voltage across the electrodes at the end of a weld period.

The operating winding 26 of relay 24 is connected in the anode-cathode circuit of a three-element electric valve 28 of the high vacuum type and in circuit with a resistance element 27 across a resistance element 29. This resistance element forms part of a voltage divider comprising resistance elements 29 and 30 connected in series with one another across a source of direct current voltage 31, 32. Control element 33 of electric valve 28 is connected through a resistance element 33' to the positive terminal of capacitor 20. This capacitor is also provided with a discharge circuit including a resistance element 34.

The source of direct current voltage 31, 32 may be obtained in any suitable manner. In the arrangement illustrated, it is obtained from a voltage divider including a resistance element 35, a potentiometer 36, and a resistance element 37 connected in series with one another across the output circuit of a full-wave rectifier. This rectifier is connected to the source of alternating current supply 5 by means of a transformer 38 having a mid-tapped secondary winding 39 connected with the arc discharge device 40 to provide full-wave rectification. The output of this rectifier is filtered by means of inductances 41 and 42 and capacitors 43 and 44 and applied across the voltage divider 35, 36, 37.

Assuming that the last half cycle of current flow between welding electrodes 1 during a welding period is of positive polarity, the connections of capacitors 19 and 20 through unidirectional conducting devices 21 and 23 and transformer 16 are such that current will flow during such positive half cycles and produce a charge on these capacitors, assuming of course that the circuit for capacitor 19 is completed through the contacts 25 of relay 24. During the first positive half cycle, the charge on capacitor 20 will become sufficient to overcome the negative bias voltage appearing across resistance element 30 between control element 33 and the cathode of electric valve 28 and thereby render this valve conducting to energize the operating winding 26 of relay 24. This relay will thereupon close its contacts 25 and complete the charging circuit of capacitor 19. At the end of a welding period, capacitor 20 will be discharged through its parallel-connected resistor 34 and the negative bias across resistance element 30 will again render electric valve 28 non-conducting thereby causing relay 24 to open its contacts 25. Thereafter when the electrodes 1 are separated from the work, if any sparking occurs between them and the work due to the inductance of the secondary circuit of the welding transformer, the voltage across these electrodes during such sparking can in no way increase the charge imparted to capacitor 19 by the last half cycle of welding current flow.

Capacitor 19 is discharged in response to half cycles of a polarity opposite that of the last half cycle of an energization period of the resistance welding transformer 3 through the agency of an electric valve 45 of the type employing an ionizable medium such as a gas or vapor. The anode-cathode circuit of electric valve 45 is connected in circuit with a current limiting resistance element 46 across the terminals of capacitor 19. In order to insure that electric valve 45 commutates out successfully after discharging capacitor 19, a series connected resistance element 47 and capacitor 48 are connected in the anode-cathode circuit of this valve across load limiting resistance element 46.

The control element 49 of electric valve 45 is connected through resistance elements 50, 51 and 37 to its cathode. Resistance element 37 is shunted by a capacitor 52 and resistance element 51 is shunted by the secondary winding 53 of a control transformer 54. Capacitor 52 serves to stiffen the bias voltage across resistance element 37 and resistance element 51 serves to dampen oscillations in the circuit of secondary winding 53 of control transformer 54.

The primary of control transformer 54 is actually the secondary of the welding transformer 3. In the arrangement illustrated this result has been obtained by placing its magnetic core structure 55 about one of the electrodes 1 and supporting it on the arm of the welding machine by means of which this electrode is supported. This transformer 54 is a saturable inductive device, that is its core structure 55 is readily saturated by small values of current flow in the welding circuit. Consequently, the output voltage of its secondary 53, which also appears across resistance element 51, is a sharp peak affair which occurs when the current in the welding circuit passes through zero value. When the welding current passes through zero, a single peak will be produced if full half cycles of current are flowing. If, due to heat control, less than full half cycles of current are flowing, there will be two peaks of like polarity occurring when the current decreases to zero value and subsequently after a period of no current flow, when the current increases from zero value. At such times the peak voltage wave derived from control transformer 54, when of proper polarity, overcomes the negative bias voltage across resistance element 37 and capacitor 52 to render electric valve 45 conductive and thereby discharge capacitor 19. The secondary winding 53 of control transformer 54 is connected so that at the end of the last half cycle of current flow in the welding circuit, a positive peak of voltage will not be produced and consequently will not render electric valve 45 conductive so that the final charge on capacitor 19 due to the last half cycle of welding current flow will be maintained during the immediately following period of deenergization of the welding circuit.

The voltage value of capacitor 19 is indicated by a milliammeter 55 connected in circuit with a resistance element 56, a potentiometer 57, and the anode-cathode circuit of an electric valve 58 across the direct current source of supply 31, 32. The control element 59 of electric valve 58 is connected through a resistance element 60 to the positive terminal of capacitor 19. Electric valve 58 is of the high vacuum type and is connected in a cathode following manner to record the voltage across capacitor 19. In order to provide a range adjustment for milliammeter 55, which is functioning as a voltmeter, resistance element 56 may be made adjustable.

Means may be provided for operating a signal when the voltage of capacitor 19 due to the last half cycle of welding current flow is not within certain operational limits previously established as necessary for obtaining a satisfactory weld. In the system of Fig. 1 the signal device is an electric discharge device 61 which is illuminated only when the voltage of condenser 19 is within the limits established for a good weld. This electric valve 61 is connected across a resistance element 62 in circuit with a resistance element 63, and the anode-cathode circuit of an electric valve 64 across the secondary 65 of transformer 38. The anode-cathode circuit of an electric valve 66 is connected in shunt to the anode-cathode circuits of the series connected electric valves 61 and 64. Consequently, when electric valve 64 becomes conductive, electric valve 61 will be illuminated by reason of its connection across the secondary 65 of transformer 38. On the other hand, when electric valve 66 becomes conductive, electric valve 61 is shunted down and thereby extinguished. These electric valves 61, 64, and 66 are preferably of the type employing an ionizing medium such as a gas or vapor.

The cathodes of electric valves 64 and 66 are connected to the slider of potentiometer 36 forming part of the voltage divider 35, 36, 37. The control element 67 of electric valve 64 is connected through resistance element 68 to a terminal 69 of the cathode following circuit embodying electric valve 58 and the control element 70 of electric valve 66 is connected through a resistance element 70' to the slider of potentiometer 57 in this cathode following circuit. Consequently, the position of the slider on potentiometer 36 determines the lower limit of voltage in the cathode following circuit at terminal 69 which will render electric valve 64 conductive and the position of the slider on potentiometer 57 determines the upper limit of voltage in the cathode following circuit which will not render electric valve 66 conductive. Thus, if the voltage of condenser 19 and consequently the voltage of terminal 69 in the cathode following circuit does not equal the value of voltage determined by the position of the slider on potentiometer 36, electric valve 64 will not be made conductive and as a result thereof electric valve 61 will not be illuminated, thereby indicating the formation of a defective weld. On the other hand, if the voltage across capacitor 19 and consequently the voltage of terminal 69 of the cathode following circuit is greater than a predetermined value, the voltage determined by the position of the slider on potentiometer 57 in the cathode following circuit will be sufficient to render electric valve 66 conductive, and by shunting electric valves 61 and 64 will extinguish electric valve 61 and again indicate the formation of an unsatisfactory weld. Only when the voltage of the capacitor 19 and the terminal 69 of the cathode following circuit of electric valve 58 is within the limits established by potentiometers 36 and 57 will the electric valve 61 be illuminated, indicating the formation of a satisfactory weld.

In the system illustrated electric valves 45, 64 and 66 are provided with shielding grids which are connected to their cathodes. Transient suppressing capacitors are also connected between the control elements and cathodes of these electric valves.

Although the operation of the system of Fig. 1 is believed to be apparent from the foregoing detailed description thereof, it may be briefly summarized as follows:

Closure of initiating switch 14 will cause welding transformer 3 to be energized one or more times from the source of alternating current supply 5 depending on the control exerted on electric valves 7 and 8 by timer 13. Each period of energization will last for a predetermined number of half cycles ending with a half cycle of the same polarity and the periods of energization will be separated from one another by predetermined periods of deenergization if more than one period of energization is occasioned by timer 13. The magnitude of the current flow will depend upon the adjustment of heat control 15.

Assuming that the last half cycle value of an energization period of the welding circuit is of positive polarity, control transformers 16 and 54 of the indicating circuit are properly connected to charge capacitors 19 and 20 during positive half cycles of current flow and to discharge capacitor 19 at the end of a negative half cycle of current flow in the welding circuit.

The first positive half cycle of current flow in the welding circuit will induce a voltage in secondary 18 of control transformer 16 in a direction to charge capacitor 20 through unidirectional current conducting device 23 and resistance element 22. The charge thus imparted to capacitor 20 will overcome the negative bias voltage across resistance element 30 and impress between control element 33 and the cathode of electric valve 28 a positive value of voltage sufficient to render this valve conducting. Conductivity of electric valve 28 will energize operating winding 26 of relay 24 through resistance element 27 in response to the direct current voltage appearing across resistance element 29 of voltage divider 29, 30 connected across the direct current source of supply 31, 32. This energization of relay 26 will cause it to close its contacts 25, thereby completing the charging circuit for capacitor 19. Consequently, the next positive half cycle of current flow in the welding circuit will charge capacitor 19 through the unidirectional current conducting device 21 to a value of voltage corresponding to that of the maximum voltage occurring across welding electrodes 1.

At the end of the first negative half cycle of current flow in the welding circuit, transformer 54 will produce a positive peak of voltage in its secondary winding 53. This secondary winding 53 is connected across a resistance element 51 in the control circuit of electric valve 45 and the positive peak of control voltage generated in its secondary winding 53 and appearing across resistance element 51 will be sufficient to overcome the negative bias voltage appearing across resistance element 37 and capacitor 52 also connected in the excitation circuit of electric valve 45. Consequently, control element 49 of electric valve 45 will become positive relative to its cathode causing it to become conductive and discharge capacitor 19 through resistance element 46. If, due to heat control less than full half cycles of current flow in the welding circuit, there will be a second positive peak of voltage induced in secondary 53 of transformer 54 at the beginning of the next positive half cycle of current flow but this will have no useful effect since the first positive voltage peak will have caused electric valve 45 to discharge capacitor 19. Resistance element 47 connected in series with capacitor 48 across resistance element 46 will cause electric valve 45 to commutate successfully after discharge of capacitor 19.

Thereafter, during positive half cycles of current flow in the welding circuit capacitor 19 will be charged and at the end of negative half cycles of current flow it will be discharged. Consequently, at the end of a welding period which has been assumed ends with a half cycle of positive polarity, capacitor 19 will be left with a charge depending on the maximum value of the voltage across welding electrodes 1.

Shortly after the welding period ends, capacitor 20 will have discharged sufficiently through resistance element 34 to reduce the current flow through electric valve 28 to a value that will cause relay 24 to open its contacts 25. Consequently, any residual voltage of the welding circuit will not be impressed on capacitor 19 when electrodes 1 are separated from the work and thereby give a false indication of the magnitude of the last half cycle value of welding current flow previously recorded as a charge on the capacitor. To accomplish this purpose, it is only necessary that before the welding electrodes are separated from the work after a welding operation, capacitor 20 be discharged sufficiently through the circuit including resistance element 34 to cause electric valve 28 to decrease the energization of relay 24 enough to cause it to open its contacts 25 in the charging circuit of capacitor 19.

Control element 59 of electric valve 58 is connected to be responsive to the charge on capacitor 19. Consequently, at the end of a welding period electric valve 58 will be rendered conductive in accordance with the charge on capacitor 19 causing a current flow through milliammeter 55 corresponding in magnitude to the voltage of capacitor 19. The deflection of the pointer of milliammeter 55 will thus indicate the magnitude of the voltage of capacitor 19. This indication will be maintained during the deenergization period of the welding circuit and consequently may be readily observed by the welding operator after each welding operation.

The charge on capacitor 19 also causes the terminal 69 of the cathode following circuit including electric valve 58 to attain a corresponding value. This voltage value is applied to control element 67 of electric valve 64 and if greater than the cathode potential of this valve will cause it to become conductive, thereby connecting electric valve 61 across the secondary 65 of transformer 38. The minimum value of voltage necessary to render electric valve 64 conducting is determined by the cathode potential thereof and this in turn is determined by the position of the slider of potentiometer 36 of the voltage divider 35, 36, and 37. Consequently, if the voltage of terminal 69 does not attain the value determined by the position of the slider on potentiometer 36, electric valve 64 will not become conductive and electric valve 61 will not be illuminated by being connected across secondary 65 of transformer 38. Potentiometer 36 thus furnishes an adjustment for the minimum value of voltage across capacitor 19 which will operate signal device 61.

The cathode potential of electric valve 66 is also determined by the adjustment of the slider on potentiometer 36. The voltage applied to its control element 70 however is dependent upon the adjustment of the slider of potentiometer 57 in the cathode following circuit including electric valve 58. Consequently, if the potential of terminal 69 of this cathode following circuit increases beyond a predetermined value for a given adjustment of potentiometer 57, electric valve 66 will become conductive. When electric valve 66 becomes conductive, it completes a shunt circuit about electric valves 61 and 64 and thus extinguishes electric valve 61 whose circuit has been previously completed by electric valve 64 becoming conductive. Consequently, if the voltage across capacitor 19 is greater than a predetermined value determined by the position of the slider of potentiometer 57, signal device 61 is not energized. It is thus seen that only when the voltage of capacitor 19 is between predetermined limits is signal device 61 operated to inform the welder that a satisfactory weld has been made.

When the welding circuit is again energized to make the next weld, the first half cycle of negative current flow will, in the manner described, cause electric valve 45 to discharge capacitor 19. Thereafter the operation of the circuit will be as above described and at the end of the next welding operation, capacitor 19 will acquire a charge indicative of the quality of the next weld thus formed.

In Fig. 2 I have illustrated another embodiment of my invention. The load circuit including the welding transformer is the same as that illustrated in Fig. 1 of the drawings, and like reference numbers have been applied to corresponding parts. Fig. 2 of the drawings has been simplified by omitting therefrom the excitation control circuits for electric valves 7 and 8 connected in the load circuit. It is to be understood that an arrangement similar to that shown in Fig. 1 or some other suitable arrangement will be employed to control the intermittent energizations of the welding transformer 3 from the source of alternating current supply 5.

The capacitor 71 of Fig. 2 corresponds in function to capacitor 19 of Fig. 1, above described. It is charged during half cycles of current flow corresponding in polarity to the last half-cycle of a welding period and discharged during half cycles of current flow of the opposite polarity. Its charging circuit is connected to be responsive to the voltage across the welding electrodes 1. Thus, at the end of a welding period it has acquired a charge corresponding in magnitude to the maximum value of the last half cycle of voltage across the welding electrodes.

In Fig. 2 the time element relay 24 of Fig. 1 has also been omitted in order to simplify the drawing. It is to be understood however that it or an equivalent device may be used when the welding operation is so conducted that residual voltage in the welding circuit gives a false indication of the magnitude of the last half cycle of welding current flow previously recorded as a charge on capacitor 71.

As in Fig. 1 the charge on capacitor 71 is applied through a resistance element 72 to the control element 73 of an electric valve 74, forming part of an indicating circuit. This indicating circuit includes a milliammeter 75, a resistance element 76, and electric valve 74 connected in series with one another across a source of direct current supply 77, 78. The conductivity of electric valve 74, which is of the high vacuum type, will be controlled by the charge on the capacitor 71 and the resulting flow of current in the indicating circuit will cause the pointer of the milliammeter to be deflected in accordance with the voltage of capacitor 71. Thus the milliammeter 75 functions as a voltmeter and during the period of deenergization of the welding circuit will indicate the value of the last half cycle of voltage across the welding electrodes during the immediately preceding welding period.

The direct current voltage 77, 78 for the indicating circuit may be obtained in any suitable manner. In Fig. 2 it has been obtained from a voltage divider circuit including resistance elements 79, 80, and 81. These resistance elements are connected in series with one another across the output terminals of a full wave rectifier including an electric discharge device 82 and a transformer 83. The output of this rectifier is suitably filtered by inductances 84 and capacitors 85.

Capacitor 71 is connected through a unidirectional current conducting device 86 to one of the secondary windings 87 of a control transformer 88 whose primary 89 is connected across the welding electrodes 1. Control transformer 88 and unidirectional conducting device 86 are connected so that capacitor 71 is charged only in response to half cycles of voltage across welding electrodes 1 corresponding in polarity to the last half cycle of welding current flow in the load or welding circuit.

In order to avoid a direct current saturation effect in transformer 88, its secondary winding 87 is also connected to a loading circuit including a unidirectional current conducting device 90 and an adjustable resistance element 91. Unidirectional current conducting device 90 is poled to pass half cycles of current having a polarity opposite to that for which unidirectional current conducting device 86 is poled. Thus by reason of the loading circuit, current is allowed to flow in both directions through secondary winding 87 of control transformer 88 and the amount of current flowing in the loading circuit may be adjusted to a value equivalent to that flowing in the charging circuit of capacitor 71. Unidirectional current conducting devices 86 and 90 may be of any suitable type, and have been illustrated as electric discharge devices. Primary 89 of control transformer 88 has been illustrated as being provided with an adjustable connection 92 in order to vary the number of primary turns connected across the welding electrodes.

Capacitor 71 is discharged by means of an electric valve 93 in response to half cycles of current flow in the welding circuit which are of a polarity opposite that of the last half-cycle of a welding period. The discharge circuit of capacitor 71 is completed through the anode-cathode circuit of this electric valve and a current limiting resistance element 94 connected in series therewith. Electric valve 93 is preferably of the type embodying an ionizable medium such as a gas or vapor. The excitation of its control element 95 depends upon a component of voltage derived from another secondary 96 of control transformer 88 and a component of voltage derived from the secondary 97 of another control transformer 98 having a primary winding 99. These control voltages are introduced into two parallel connected branches of an excitation circuit for electric valve 93. One branch of this excitation circuit is polarized by a unidirectional current conducting device 100. This device has been illustrated as an electric discharge device having its anode directly connected to the control element 95 of electric valve 93 and its cathode connected toward the cathode of electric valve 93 in circuit with the secondary winding 97 of control transformer 98 and the negative bias voltage across resistance elements 81 and 80 of voltage dividers 79, 80, and 81. The positive terminal of the bias voltage across resistance element 80 is connected to the cathode of electric valve 93 and its negative terminal is connected through secondary 96 of control transformer 88, and a resistance element 101 to the control element 95 of electric valve 93. It is to be noted that electric discharge device 100 is poled to conduct current from the nonpolarized excitation circuit of electric valve 93 through the resistance element 101 thereof.

The primary 99 of control transformer 98 is connected to a phase shift network 102 through a variable resistance element 103 and a series resonant circuit including a non-saturable inductive element 104 and a capacitor 105. This resonant circuit is tuned approximately to the frequency of the supply circuit 5 by means of which the phase shift network 102 is energized. This phase shift network includes an adjustable resistance element 106 connected in series with a capacitor 107 across the primary winding 108 of transformer 83. The series circuit including primary winding 99 of transformer 98, adjustable resistance 103, inductance 104, and capacitor 105 is connected by means of conductors 109 across the common connection of capacitor 107 with resistance element 106 and the midpoint of the primary winding 108 of transformer 83. Control transformer 98 is a saturable inductive device having an output voltage of peaked wave form. The control transformer 98 and its energizing connections forms the subject matter of United States Letters Patent 2,246,177, Louis G. Levoy, Jr., granted June 17, 1941, and assigned to the assignee of this invention. Reference may be had to this patent for a more complete description thereof.

As previously stated, capacitor 71 is connected through unidirectional current conducting device 86 and control transformer 88 across resistance welding electrodes 1 in a manner to be charged during voltage cycles of a polarity corresponding to that of the last half-cycle of a welding period. During cycles of opposite polarity, electric valve 93 is energized to discharge capacitor 71. To accomplish this purpose, secondary 96 of transformer 88 and secondary 97 of transformer 98 are connected so as to apply positive voltages to the control element 95 of electric valve 93 during cycles of a polarity opposite that of the last half cycle of a welding period. In order to render electric valve 93 conductive, the component of voltage derived from secondary 96 of transformer 88 must be greater than the bias voltage appearing across resistance element 80 connected in circuit therewith in the control element-cathode circuit of electric valve 93. Furthermore, the component of voltage derived from secondary 97 of transformer 98 must be of sufficient magnitude to overcome the bias voltages appearing across resistance elements 80 and 81 also connected in the control element-cathode circuit of this valve. When both the components of control voltage derived from secondary 96 of transformers 88 and secondary 97 of transformer 98 occur at the same time and are of the values stated, electric valve 93 will be rendered conductive to discharge capacitor 71.

If the components of voltage derived from secondary 96 of transformer 88 in addition to the bias voltage appearing across resistance element 81 is greater than the component of voltage derived from secondary 97 of transformer 98, current will flow through unidirectional current conducting device 100 producing a voltage drop across resistance element 101 which will equalize the sum of the components of voltages in the parallel connected circuits 101, 96 and 100, 97, 81. Under such circumstances, the bias voltage across resistance elements 80, 81 is matched against the voltage derived from secondary 97 of transformer 98 and when this latter voltage is greater than this bias voltage, electric valve 93 will be rendered conductive. If, however, the component of voltage derived from secondary 97 of transformer 98 is equal to the sum of the voltages derived from secondary 96 of transformer 88 and from resistance element 81, the unidirectional current conducting device 100 will become nonconductive and for an interval of time corresponding to the width of the voltage peak at this time, control will be momentarily transferred to the circuit including resistance element 101, secondary 96 of transformer 88 and resistance element 80 of voltage divider 79, 80, 81. That is not until the peak voltage derived from secondary 97 of transformer 98 renders unidirectional current conducting device 100 nonconductive does the control voltage derived from the secondary 96 of transformer 88 become effective to render electric valve 93 conductive, assuming of course that this voltage of 96 is greater than the bias voltage across resistance element 80. While unidirectional current conducting device 100 is conductive the control voltage derived from secondary 96 of transformer 80 is restrained by the voltage drop across resistance element 101 and not until this restraint is removed by the voltage of the secondary 97 of transformer 98 rendering unidirectional current conducting device 100 nonconductive is control transferred to the circuit including the secondary 96 of transformer 88. In the above considerations, the voltage drop across unidirectional current conducting device 100 has, for convenience, been considered to be of zero value.

As previously stated, the output voltage of transformer 98 is of peaked wave form. In phase it is adjusted by means of network 102 so that it occurs after current ceases to flow in the welding circuit as a result of a cycle of voltage corresponding in polarity to the last half cycle of a welding period. That is, it must occur after the current flow resulting from this cycle has decreased to zero and after any hangover flow of current occurring thereafter as a result of the inductance of the welding circuit. In phase it is also adjusted so as to occur concurrently with the flow of welding current during a cycle having a polarity opposite that of the last half cycle of energization of the welding circuit. To satisfy this requirement, it must occur late enough in said half cycle to permit current adjustments to the lowest value permissible with the heat control provided for controlling the amount of current flow in the welding circuit through the agency of electric valves 7 and 8.

With such adjustments and arrangements it is apparent that even though the component of voltage derived from secondary 96 of control transformer 88 varies in magnitude over a wide range, so long as this voltage is greater in magnitude than the bias voltage across resistance element 80 and so long as the peak voltage wave derived from secondary 97 of control transformer 98 is greater than the bias voltages across resistance elements 80 and 81, electric valve 93 will be rendered conductive. It is of course apparent that the bias voltage across resistance element 81 in circuit with the secondary 97 of transformer 98 may, under certain circumstances, be omitted. In the arrangement illustrated it has been provided so that the voltage peak derived from transformer 98 increases from values below the cathode voltage of electric valve 93 to values above such voltage by amounts that are substantially equal. Such an arrangement will allow for maximum variation in the operating characteristics of the electric valves employed.

In view of the above description of the operations of the component parts of the apparatus shown in Fig. 2, its operation as a whole is believed to be apparent. As previously stated, the system functions to impart a charge to capacitor 71 during half cycles of a polarity corresponding to that of the last half cycle of a welding period and to discharge capacitor 71 during half cycles of opposite polarity. Consequently, at the end of a welding period capacitor 71 will retain a charge which, through the agency of electric valve 74, will energize the indicator circuit including milliammeter 75 and provide an indication on milliammeter 75 informing the welding operator of the value of the last half cycle of voltage across the welding electrodes during the welding period. This indication will be maintained during the deenergization period immediately following a welding period and when the next welding operation is initiated, the system will again function to give an indication of the value of the last half cycle of voltage of that welding period.

It is of course apparent that the signalling system previously described in connection with Fig. 1 may be embodied in the system of Fig. 2. In like manner, the commutation circuit for electric valve 45 of Fig. 1 may be associated with the corresponding electric valve 93 of Fig. 2. Various other commutation circuits may be likewise employed. For example, sufficient inductance may be placed in the anode-cathode circuits of these valves to insure that they commutate out after discharging the capacitors with which they are associated. If such conductive arrangements are employed, the charging rates of these capacitors must be such that any reversal of charge thereon due to the inductive circuit, will not prevent them from acquiring a charge that is indicative of the voltage across the welding electrodes during half cycles of voltage corresponding in polarity to that of the last half cycle of a welding period.

It is also apparent that the loading circuit of Fig. 2 which has been provided to prevent direct current saturation of the control transformer having its primary connected across the welding electrodes, may likewise be embodied in the system of Fig. 1. In either system circuits may be provided for interrupting a welding operation when the voltage across a weld attains a predetermined value. For example, the signalling system of Fig. 1 may be modified to accomplish this result in accordance with the disclosure in United States Letters Patent 2,264,067, Dudley E. Chambers, granted November 25, 1941, and assigned to the assignee of this invention.

The above suggested modifications, as well as other modifications, may be made in the embodiments of my invention illustrated and described above without departing from the spirit and scope of my invention. I aim, consequently, in the appended claims to cover all those modifications which come within the true spirit and scope of my invention.

What I claim as new and desire to secure by Letters Patent of the United States is:

1. Apparatus for use with a load circuit that is intermittently energized from a source of alternating current, said apparatus comprising means including a device for obtaining a measurement of the last half cycle value of an electrical condition that occurs in said load circuit during a period of energization thereof, and means for maintaining the energization of said device and said measurement obtained thereby during the immediately following period of deenergization of said load circuit.

2. Apparatus for use with a load circuit that is intermittently energized from a source of alternating current, said apparatus comprising means including a device for obtaining a measurement of the last half cycle value of an electrical condition that occurs in said load circuit during a period of energization thereof, means for maintaining the energization of said device and said measurement obtained thereby during the immediately following period of deenergization of said load circuit, and means for indicating when said measurement falls within predetermined limits of magnitude.

3. An alternating current supply circuit, a load circuit, means for intermittently energizing said load circuit from said supply circuit, means responsive only during half cycles of a polarity corresponding to that of the last half cycle of an energization period of said load circuit for obtaining measurements of the last half cycle values of an electrical condition that occurs in said load circuit during its periods of energization, means for maintaining each of said measurements during the immediately following period of deenergization of said load circuit, and means for indicating when said measurement falls within predetermined limits of magnitude.

4. Apparatus comprising an alternating current supply circuit, a load circuit, means for intermittently energizing said load circuit from said supply circuit, means effective during a period of energization of said load circuit and responsive only during half cycles of a polarity corresponding to that of the last half cycle of an energization period of said load circuit for obtaining a measurement of the magnitude of the last half cycle value of an electrical condition in said load circuit, and means for indicating when said measurement falls within predetermined limits of magnitude.

5. Apparatus for use with a load circuit that is intermittently energized from a source of alternating current, said apparatus comprising a source of voltage, an indicating circuit including an electric valve having a control element and having its anode-cathode circuit connected in series with a resistance element across said source of voltage, an indicator connected to be responsive to the amount of current flow through said resistance element in said indicating circuit, a capacitor, means for charging said capacitor to a voltage indicative of the magnitude of the last half cycle value of an electrical condition of said load circuit during its periods of energization, and means for connecting said control element of said electric valve to be responsive to the voltage of said capacitor.

6. Apparatus for use with a load circuit that is intermittently energized from a source of alternating current, said apparatus comprising a source of voltage, an indicating circuit including an electric valve having a control element and having its anode-cathode circuit connected in series with a resistance element across said source of voltage, an indicator connected to be responsive to the amount of current flow through said resistance element in said indicating circuit, a capacitor, means for charging said capacitor to a voltage indicative of the magnitude of the last half cycle value of an electrical condition of said load circuit during its periods of energization, means for connecting the control element of said electric valve to be responsive to the voltage of said capacitor, and means for maintaining during the period of deenergization of said load circuit immediately following a period of energization thereof the charge imparted to said capacitor by said last half cycle value of said period of energization.

7. Apparatus for use with a load circuit that is intermittently energized from a source of alternating current, said apparatus comprising a source of voltage, an indicating circuit including an electric valve having a control element and having its anode-cathode circuit connected in series with a resistance element across said source of voltage, an indicator connected to be responsive to the amount of current flow through said resistance element in said indicating circuit, a capacitor, means responsive to half cycles of a polarity corresponding to the last half cycle of an energization period of said load circuit for charging said capacitor to a voltage indicative of the magnitude of the last half cycle value of an electrical condition of said load circuit during its periods of energization, means responsive to half cycles of a polarity opposite that of the last half cycle of the energization period of said load circuit for discharging said capacitor, and means for connecting the control element of said electric valve to be responsive to the voltage of said capacitor.

8. Apparatus for producing an indication of the last half cycle value of an electrical condition of a load circuit which is intermittently energized from a source of alternating current for periods of time ending with half cycles of like polarity, said apparatus comprising means for measuring an electrical value, means responsive to half cycles of a polarity corresponding to the last half cycle of an energization period of said load circuit for energizing said measuring means in accordance with the magnitude of an electrical value that occurs in said load circuit during said periods of energization, means responsive to half cycles of a polarity opposite that of the last half cycle of an energization period of said load circuit for rendering said last mentioned means sensitive to electrical values of said load circuit which are of smaller magnitude than those previously measured, and means for maintaining the energization of said measuring means at the value obtained for said last half cycle of an energization period of said load circuit during the immediately following period of deenergization of said load circuit.

9. Apparatus for producing an indication of the last half cycle value of an electrical condition of a load circuit which is intermittently energized from a source of alternating current for periods of time ending with half cycles of like polarity, said apparatus comprising a source of voltage, an electric valve and an indicating device connected in series and for energization from said source of voltage, said valve including a control member, a capacitor, means for connecting the control member of said electric valve with said capacitor to vary the energization of said indicating device in accordance with the voltage of said capacitor, means responsive to half cycle values of said alternating current source having a polarity corresponding to the last half cycle of an energization period of said load circuit for charging said capacitor to a voltage indicative of the magnitude of the last half cycle value of an electrical condition of said load circuit during its periods of energization, a resistance element and a second electric valve connected with said capacitor for establishing a discharge circuit therefor, said second electric valve including a control member, and means responsive to half cycle values of said alternating current source having a polarity opposite that of said last half cycle of an energization period of said load circuit for discharging said capacitor.

10. Apparatus for use with a load circuit that is intermittently energized from a source of alternating current for periods of time ending with half cycles of like polarity, said apparatus comprising a source of voltage, an indicating circuit including an electric valve having a control element and having its anode-cathode circuit connected in series with a resistance element across said source of voltage, an indicator connected to be responsive to the amount of current flow through said resistance element in said indicating circuit, a capacitor, means for connecting the control element of said electric valve to be responsive to the voltage of said capacitor, means responsive to half cycles of a polarity corresponding to the last half cycle of an energization period of said load circuit for charging said capacitor to a voltage indicative of the magnitude of the last half cycle value of an electrical condition of said load circuit during its period of energization, a discharge circuit including a second electric valve having a control element and having its anode-cathode circuit connected in series with a current limiting means across said capacitor, an excitation circuit for said second electric valve connected between its control element and its cathode, and means responsive to half cycles of a polarity opposite that of the last half cycle of the energization period of said load circuit for introducing a control voltage in said excitation circuit of said second electric valve which renders said second electric valve conductive and discharges said capacitor.

11. Apparatus for producing an indication of the last half cycle value of an electrical condition in a translating device which is intermittently energized from a source of alternating current for periods of time ending with half cycles of like polarity, said circuit comprising a source of direct current voltage, an electric valve and an indicating device connected in series and for energization from said source, said valve including a control member, a capacitor, means connecting the control member of said electric valve with said capacitor to vary the current supplied to said indicating device in accordance with the voltage of said capacitor, means responsive to half cycle values of said alternating current source having a polarity corresponding to the last half cycle of an operating period of said intermittently energized translating device for charging said capacitor to a voltage indicative of the magnitude of the last half cycle value of an electrical condition in said translating device during its periods of energization, a resistance element and a second electric valve connected in series with said capacitor for establishing a discharge circuit therefor, said second electric valve including a control member, and means responsive to half cycle values of said alternating current source having a polarity opposite that of said last half cycle of an operating period of said intermittently energized translating device for applying to the control element of said second electric valve a voltage which renders said second electric valve conducting and conditions said capacitor for recording the value of an electrical condition in said translating device during half cycles of a polarity corresponding to that of the last half cycle of an operating period of said intermittently energized translating device.

12. Apparatus for use with a load circuit that is intermittently energized from a source of alternating current for periods of time ending with half cycles of like polarity, said apparatus comprising a source of voltage, an indicating circuit including an electric valve of the high vacuum type having a control element and having its anode-cathode circuit connected in series with a resistance element across said source of voltage, an indicator connected to be responsive to the amount of current flow through said resistance element in said indicating circuit, a capacitor, means for connecting the control element of said electric valve to be responsive to the voltage of said capacitor, means responsive to half cycles of a polarity corresponding to the last half cycle of an energization period of said load circuit for charging said capacitor to a voltage indicative of the magnitude of the last half cycle value of an electrical condition of said load circuit during its periods of energization, a discharge circuit including an electric valve of the gaseous discharge type having a control element and having its anode-cathode circuit connected in series with a resistance element across said capacitor, an excitation circuit connected between the control element and the cathode of said last mentioned valve, means responsive to half cycles of a polarity opposite that of the last half cycle of the energization period of said load circuit for introducing a control voltage in said excitation circuit of said last mentioned electric valve which renders said last mentioned electric valve conductive and discharges said capacitor, and a commutation circuit for said last mentioned electric valve, said commutation circuit being connected across said resistance element in the anode-cathode circuit of said last-mentioned electric valve and including a resistance element and a capacitor connected in series with one another.

13. Apparatus for use with a load circuit that is intermittently energized from a source of alternating current for periods of time ending with half cycles of like polarity, said apparatus comprising a capacitor, means connected to said capacitor and responsive to half cycles of voltage across said load circuit corresponding in polarity to the last half cycle of its periodic energization for charging said capacitor, a discharge circuit for said capacitor, said discharge circuit including an electric valve having a control element and having its anode-cathode circuit connected in series with a current limiting means across said capacitor, means including a saturable inductive device energized in response to the flow of current through said load circuit for producing a voltage of peaked wave form on the control element of said electric valve when the current in said load circuit passes through zero value, said inductive device being connected so that said electric valve is rendered conductive at the end of a half cycle of current flow resulting from half cycles of voltage of a polarity opposite that of the last half cycle of an energization period of said load circuit, a source of voltage, an indicating circuit including a second electric valve having a control element and having its anode-cathode circuit connected in series with a resistance element across said source of voltage, an indicator connected to be responsive to the amount of current flow through said resistance element in said indicating circuit, and means for connecting the control element of said second electric valve to be responsive to the voltage of said capacitor.

14. Apparatus for use with a load circuit that is intermittently energized from a source of alternating current for periods of time ending with half cycles of like polarity, said apparatus comprising a capacitor, means responsive to half cycles of voltage across said load circuit corresponding in polarity to the last half cycle of its periodic energization for charging said capacitor, means including a time delay relay for completing the connection of said capacitor with said last mentioned means upon the energization of said load circuit and for maintaining said connection for a predetermined interval of time after said load circuit is deenergized, a discharge circuit for said capacitor, said discharge circuit including an electric valve having a control element and having its anode-cathode circuit connected in series with a current limiting means across said capacitor, means including a saturable inductive device energized in response to the flow of current through said load circuit for producing a voltage of peaked wave form on the control element of said electric valve when the current in said load circuit passes through zero value, said inductive device being connected so that said electric valve is rendered conductive at the end of a half cycle of current flow resulting from half cycles of voltage of a polarity opposite that of the last half cycle of an energization period of said load circuit, a source of voltage, an indicating circuit including a second electric valve having a control element and having its anode-cathode circuit connected in series with a resistance element across said source of voltage, an indicator connected to be responsive to the amount of current flow through said resistance element in said indicating circuit, and means for connecting the control element of said second electric valve to be responsive to the voltage of said capacitor.

15. Apparatus for use with a load circuit that is intermittently energized from a source of alternating current for periods of time ending with half cycles of like polarity, said apparatus comprising a capacitor, means responsive to half cycles of a polarity corresponding to the last half cycle of the energization period of said load circuit for charging said capacitor to a voltage indicative of the magnitude of said half cycle value of an electrical condition of said load circuit, time delay means for completing the connection of said capacitor with said last mentioned means upon the energization of said load circuit and for maintaining said connection for a predetermined interval of time after said load circuit is deenergized, a discharge circuit for said capacitor, said discharge circuit including an electric valve having a control element and having its anode-cathode circuit connected in series with a current limiting and commutating means across said capacitor, means responsive to half cycles of a polarity opposite that of the last half cycle of an energization period of said load circuit for applying a voltage to said control element of said electric valve which renders it conductive, a source of voltage, an indicating circuit including a second electric valve having a control element and having its anode-cathode circuit connected in series with a resistance element across said source of voltage, an indicator connected to be responsive to the amount of current flow through said resistance element in said indicating circuit, and means for connecting said control element of said second electric valve to be responsive to the voltage of said capacitor.

16. Apparatus comprising a source of alternating current, a load circuit, means for periodically energizing said load circuit from said source of alternating current, a capacitor, a circuit for charging said capacitor comprising a unidirectional current conducting device connected across the secondary winding of a transformer having its primary winding connected to be responsive to an electrical condition in said load circuit, said unidirectional current conducting device being poled to charge said condenser in response to half cycles of voltage across said load circuit corresponding in polarity to the last half cycle of its periodic energization, current limiting means and a second unidirectional current conducting device connected in series with one another across the secondary winding of said transformer, said second unidirectional current conducting device being poled to conduct current through said current limiting means in response to half cycles of voltage across said load circuit of a polarity opposite to that of the last half cycle of its periodic energization, a discharge circuit for said capacitor, said discharge circuit including an electric valve having a control element and having its anode-cathode circuit connected in series with a current limiting means across said capacitor, means responsive to half cycles of a polarity opposite that of the last half cycle of the energization periods of said load circuit for applying a control voltage to said control element of said electric valve and rendering it conductive, a source of voltage, an indicating circuit including a second electric valve having a control element and having its anode-cathode circuit connected in series with a resistance element across said source of voltage, an indicator connected to be responsive to the amount of current flow through said resistance element in said indicating circuit, and means for connecting said control element of said second electric valve to be responsive to the voltage of said capacitor.

17. Apparatus comprising an indicator, means including a source of voltage for controlling the energization of said indicator, an electric valve having a control element and having its anode-cathode circuit energized from said source of voltage, and two parallel connected excitation circuits for said electric valve only one of which is polarized and includes a unidirectional current conducting device having one terminal connected to said control element of said electric valve and its other terminal connected in series circuit with a source of control voltage to the cathode of said electric valve and the other of which includes a resistance element connected in series circuit with a second source of control voltage, said unidirectional current conducting device of said polarized excitation circuit being poled to conduct current from said non-polarized excitation circuit through said resistance element thereof.

18. Apparatus for producing an indication of the magnitude of an electrical condition in a load circuit that is periodically energized from a supply circuit, said apparatus comprising a capacitor, means for charging said capacitor to a voltage indicative of the magnitude of an electrical condition in said load circuit, means responsive to the voltage of said capacitor for indicating the magnitude of said electrical condition in said load circuit, means for discharging said capacitor including an electric valve having a control element and having its anode-cathode circuit connected across said capacitor, an excitation circuit for said electric valve including a resistance element having one terminal connected to the control element of said electric valve and its other terminal connected in circuit with a source of control voltage and a source of direct current bias voltage whose positive terminal is connected to the cathode of said electric valve, and a second excitation circuit for said electric valve including a unidirectional current conducting device having one terminal connected to said control element of said electric valve and its other terminal connected in circuit with a second source of periodic control voltage and a second source of direct current bias voltage having its positive terminal connected to the negative terminal of said first mentioned source of bias voltage, said unidirectional current conducting device being poled to conduct current from the terminal of said resistance element connected to the control element of said electric valve, said first source of control voltage being derived from said load circuit, and said second source of control voltage being derived from said supply circuit and having a peaked wave form whose maximum value is greater than the sum of the voltages of said sources of bias voltage.

19. Apparatus comprising a capacitor, means for charging said capacitor in response to an electrical condition of a periodically energized load circuit, means for discharging said capacitor including an electric valve having a control element and having its anode-cathode circuit connected in series with a current limiting means across said capacitor, an excitation circuit for said electric valve including a resistance element having one terminal connected to the control element of said electric valve and its other terminal connected in circuit with a source of control voltage and a source of direct current bias voltage whose positive terminal is connected to the cathode of said electric valve, a second excitation circuit for said electric valve including a unidirectional current conducting device having one terminal connected to said control element of said electric valve and its other terminal connected in circuit with a second source of periodic control voltage and a second source of direct current bias voltage having its positive terminal connected to the negative terminal of said first mentioned source of bias voltage, said unidirectional current conducting device being poled to conduct current from the terminal of said resistance element connected to the control element of said electric valve, said first mentioned source of control voltage being derived from said load circuit, and said second source of control voltage having a peaked wave form whose maximum value is greater than the sum of the voltages of said sources of bias voltage, a source of voltage, an indicating circuit including a second electric valve having a control element and having its anode-cathode circuit connected in series with a resistance element across said source of voltage, an indicator connected to be responsive to the amount of current flow through said resistance element in said indicating circuit, and means for connecting the control element of said second electric valve to be responsive to the voltage of said capacitor.

20. Apparatus comprising a source of alternating current, a load circuit, means for periodically energizing said load circuit from said source of alternating current, a transformer having a plurality of secondary windings and a primary winding connected to be energized in response to a voltage condition of said load circuit, a capacitor, a circuit for charging said capacitor comprising a unidirectional current conducting device connected in series with said capacitor across one of the secondary windings of said transformer, said unidirectional current conducting device poled to charge said condenser in response to half cycles of voltage corresponding in polarity to the last half cycle of the energization periods of said load circuit, a loading circuit including a second unidirectional current conducting device connected across said one of said secondary windings of said transformer, said second unidirectional current conducting device being poled to conduct in response to half cycles of voltage of a polarity opposite the polarity of the last half cycle of the energization periods of said load circuit, a circuit for discharging said capacitor including an electric valve having a control element and having its anode-cathode circuit connected in series with a current limiting means across said capacitor, a resistance element having one terminal connected to the control element of said electric valve and its other terminal connected in circuit with another secondary winding of said transformer and a source of direct current bias voltage the positive terminal of which is connected to the cathode of said electric valve, a second transformer of the saturable type having a secondary winding and a primary winding connected through a phase shift circuit to said source of alternating current, a third unidirectional current conducting device having one terminal connected to said control element of said electric valve and its other terminal connected in circuit with the secondary winding of said second transformer and a second source of direct current bias voltage the positive terminal of which is connected to the negative terminal of said first mentioned source of bias voltage, said third unidirectional current conducting device being poled to conduct current from the terminal of said resistance element which is connected to said control element of said electric valve and the peaked voltage of the secondary winding of said second control transformer having a polarity corresponding to that of said other secondary winding of said first mentioned control transformer and being greater in value than the sum of the voltages of said sources of bias voltage, a source of voltage, an indicating circuit including a second electric valve having a control element and having its anode-cathode circuit connected in series with a second resistance element across said source of voltage, an indicator connected to be responsive to the amount of current flow through said second resistance element in said indicating circuit, and means for connecting the control element of said second electric valve to be responsive to the voltage of said capacitor.

ORRIN W. LIVINGSTON.

REFERENCES CITED

The following references are of record in the file of this patent:

UNITED STATES PATENTS

| Number | Name | Date |
|---|---|---|
| 2,014,102 | Conklin | Sept. 10, 1935 |
| 2,143,219 | Wenger | Jan. 10, 1939 |
| 2,147,918 | Overbeck | Feb. 21, 1939 |
| 2,190,743 | Vance | Feb. 20, 1940 |
| 2,264,067 | Chamber | Nov. 25, 1941 |
| 2,269,151 | Garman | Jan. 6, 1942 |
| 2,287,926 | Zepler | June 30, 1942 |
| 2,300,198 | Brown | Oct. 27, 1942 |
| 2,309,560 | Welty | Jan. 26, 1943 |
| 2,320,916 | Dawson | June 1, 1943 |
| 2,325,390 | Garman | July 27, 1943 |
| 2,331,229 | Regan | Oct. 5, 1943 |

OTHER REFERENCES

"Vacuum Tube Voltmeters," (1941) by John F. Rider, (page 58), published by John F. Rider Publisher, Inc., New York, N. Y.

"Welding Journal," vol. 19 (1940), pages 215–218.